June 14, 1932.  W. R. SPILLER  1,862,718
FORCE AMPLIFYING MEANS
Filed Feb. 24, 1930
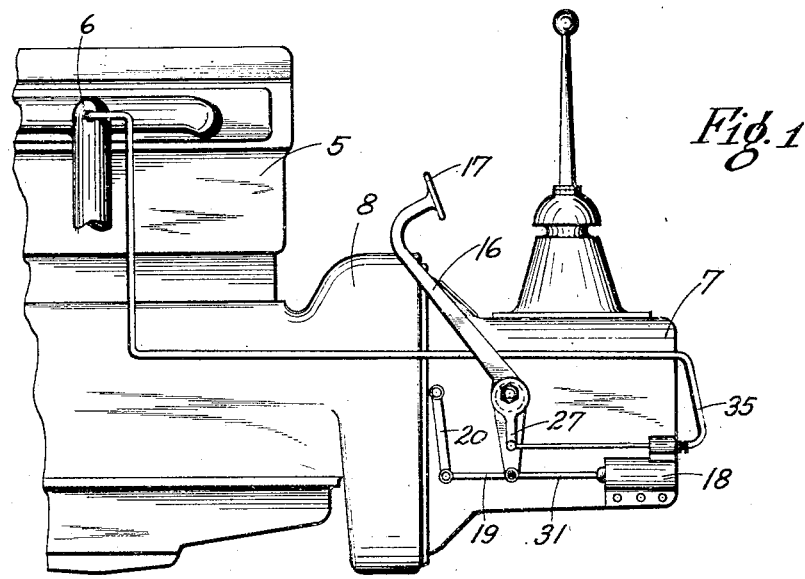
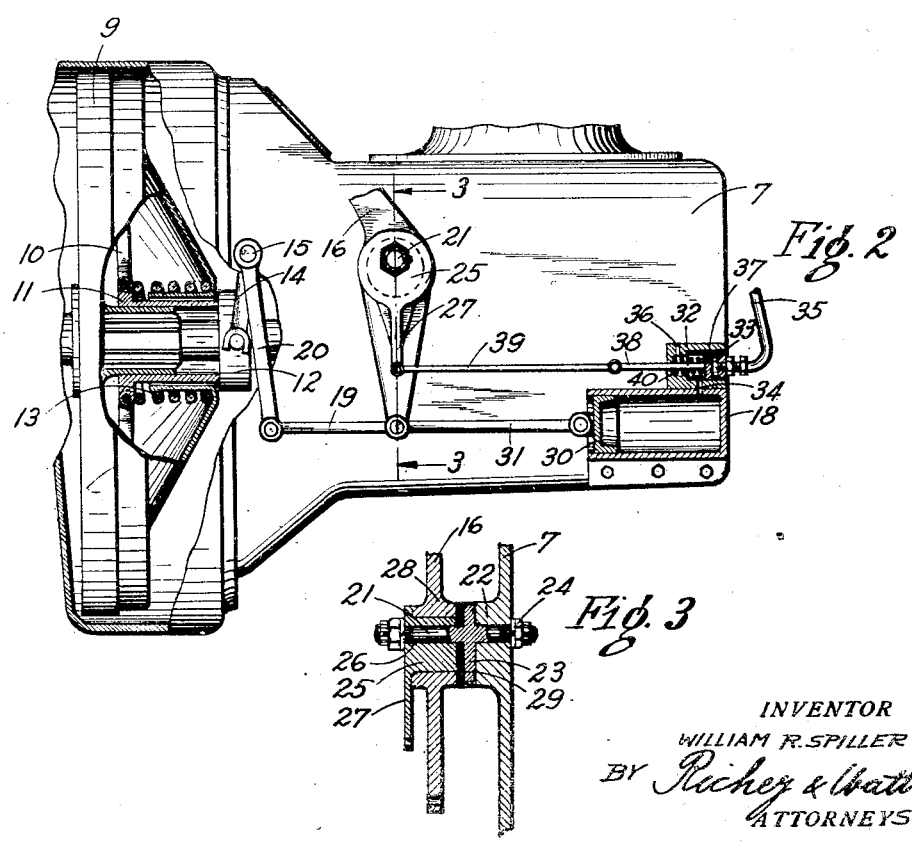
INVENTOR
WILLIAM R. SPILLER
BY Richey & Watts
ATTORNEYS Patented June 14, 1932

1,862,718

UNITED STATES PATENT OFFICE

WILLIAM R. SPILLER, OF CLEVELAND, OHIO, ASSIGNOR TO THE WHITE MOTOR COMPANY, OF CLEVELAND, OHIO, A CORPORATION OF OHIO

FORCE AMPLIFYING MEANS

Application filed February 24, 1930. Serial No. 433,151.

This invention relates to force amplifying means, and particularly to means for amplifying the force exerted by the operator on a control lever of a motor vehicle.

One object of this invention is to provide means actuated by the engine of a motor vehicle to assist the operator in disengaging the clutch.

Another object is to provide an improved means governed by the force exerted on a member for exerting additional force thereon.

A further object is to utilize the sub-atmospheric pressure existing in the intake manifold of an internal combustion engine to assist the operator of a motor vehicle in disengaging the clutch when the clutch pedal is depressed.

Another object is to provide an improved controlling means for applying fluid pressure.

Other objects relating to details of construction and economies of manufacture will appear in the following specification, in which one embodiment of the invention is disclosed.

In the accompanying drawing;

Fig. 1 is a side elevation of a portion of an internal combustion engine and a motor vehicle transmission, illustrating this invention applied to the clutch pedal;

Fig. 2 is a similar view on an enlarged scale, portions being broken away to show the construction;

Fig. 3 is a detail section taken on the line 3—3 of Fig. 2.

Referring to the drawing, the numeral 5 designates a conventional motor vehicle internal combustion engine having an intake manifold 6 and a change speed transmission within the housing 7 and connected to the engine through a friction clutch enclosed within the housing 8.

The clutch consists of a flywheel 9 having friction surfaces therewithin and a clutch plate arranged to be wedged against such friction surfaces by wedges carried by links 10. The latter are carried by a sleeve 11 having a releasing collar 12 and engaged by a spring 13. The spring normally maintains the links 10 extended and the clutch parts in engaged relation. A yoke 14 fixed to a shaft 15 journalled in the housing 7 engages the collar 12 and is adapted, when rotated, to retract the sleeve 11 against the tension of the spring and disengage the clutch parts.

The actuating means for the clutch consists of a lever 16 terminating in a pedal 17 and a fluid pressure cylinder 18. The lever 16 is journalled intermediate its length to the housing 7 and is pivotally connected at its lower end to a link 19 which in turn is pivotally connected to an arm 20 fixed to the shaft 15. The journal for the lever 16 consists of a bolt 21 passing eccentrically through a boss 22 formed on the housing 7. An integral eccentric collar 23 on the bolt 21 abuts the outer face of the boss 22, and is held thereagainst by a nut 24 on the inner end of the bolt. A cylindrical bushing 25 having a bore 26 disposed at one side of its central axis and a radially extending arm 27 diametrically opposite the bore is journalled on the bolt 21. An enlarged cylindrical bearing 28 formed in the lever 16 is journalled on the outer surface of the bushing 25. Thrust washers 29 are preferably arranged between the inner faces of the bushing 25 and bearing 28 and the outer face of the collar 23.

The cylinder 18 is bolted to the housing 7 and slidably receives a piston 30 pivoted to the rear end of a link 31, the opposite end of which is pivoted to the lower end of the lever 16. A valve casing 32 is secured to the cylinder 18 and is provided with a cylindrical bore 33 communicating with the rearward end of the cylinder 18 through a duct 34. One end of the bore 33 is connected by a tube 35 with the intake manifold 6 of the internal combustion engine, and the opposite end is open to atmosphere through a port 36.

A piston valve 37 is slidable within the bore 33 and is arranged to occupy positions on either side of the duct 34, to connect the interior of the cylinder 18 either with the intake manifold suction or the atmosphere. A stem 38 carried by the piston valve 37 is slidable through the valve casing 32 and is pivoted to one end of a link 39, the opposite end of which is pivoted to the arm 27. If desired, a return spring 40 may be interposed between the valve 37 and the casing 32 to normally maintain the cylinder 18 in communication with the atmosphere.

The diameter of the cylinder 18 is such that when the maximum suction exists in the intake manifold, as when the engine is running with substantially closed throttle, and the cylinder 18 is in communication therewith, the total differential fluid pressure on the piston 30 constitutes a substantial part of the pressure required to disengage the clutch. However, the piston 30 alone is preferably incapable of disengaging the clutch under any conditions of operation. The diameter of the bore 33 in the valve casing 32 is such that the differential fluid pressure on the piston 37 plus the force of the spring 40 is negligible in comparison to the total pressure on the piston 30.

When it is desired to disengage the clutch, the operator presses downwardly upon the pedal 17. The initial application of force tends to rotate the lever 16 in a counter-clockwise direction about its pivotal connection with the link 19 as a center. Such rotation is resisted by the bushing 25 upon which the lever 16 is journalled, and as a result of its eccentric mounting, the bushing 25 is rotated in a clockwise direction about the bolt 21, drawing the piston valve 37 to the forward end of the bore 33. The interior of the cylinder 18 is thereupon connected through the tube 35 with the intake manifold, and the excess of atmospheric pressure over the intake manifold pressure tends to move the piston 30 rearwardly. Continued pressure upon the pedal 17 maintains the valve 37 at the forward end of the valve casing and overcomes the remainder of the force of the spring 13, thereby disengaging the clutch.

To re-engage the clutch the operator allows the pedal 17 to move upwardly with a relatively slow motion, maintaining at all times some downward pressure upon the pedal. The valve 37 is accordingly maintained in its open position at the forward end of the casing 32, and the spring 13 re-engages the clutch parts against the pressure of the piston 30. When all pressure is finally removed from the pedal 17, the return spring 40 and the differential pressure on the valve 37 return the same to the rearward end of the casing 32 and open the cylinder 18 to atmosphere relieving the bearings of the releasing mechanism of all pressure.

While the foregoing description is necessarily of a detailed character in order to fully disclose an embodiment of the invention, it is to be understood that the specific terminology is not to be construed as restrictive or limiting, and it is to be further understood that various modifications and rearrangements of parts may be resorted to without departing from the scope and spirit of the invention as defined in the following claims.

I claim:

1. In combination, a spring closed clutch, a manually operable fulcrumed lever for opening said clutch, a fluid pressure cylinder having a piston associated with said lever, a valve for connecting said cylinder with a source of power to create a pressure on said piston tending to open said clutch, and means associated with the fulcrum of said lever and controlled by the pressure of said lever against its fulcrum for opening said valve.

2. In combination, a spring closed clutch, a manually operable fulcrumed lever for opening said clutch, a fluid pressure cylinder having a piston associated with said lever, a valve for connecting said cylinder with a source of power to create a pressure on said piston tending to open said clutch, and means interposed between said lever and its fulcrum arranged to open said valve when said lever presses against said fulcrum, and to close the same when such pressure is relieved.

3. In combination with a fixed support, a control lever manually operable against a resistance and pivoted on said support, power means operable to decrease said resistance, and means controlled by the pressure of said lever against its pivot for operating said power means.

4. In combination, a supporting bar, a lever pivoted thereon, an eccentric bushing between said bar and said lever, power means for exerting a force on said lever, and means controlled by rotation of said bushing for regulating said power means.

5. In combination, a supporting bearing, a member pivoted thereto, an eccentric bushing between said bearing and said member, power means for exerting a force on said member, control means for said power means associated with said bushing in such a manner as to render said power means inoperative when the force exerted thereby reacts on said bushing, and to render the same operative when an oppositely directed force reacts on said bushing.

6. In combination, a supporting bearing, a member pivoted thereto and adapted to be subjected to an initial force and a resistance, an eccentric bushing between said bearing and said member, power means for exerting a supplementary force on said member against said resistance, and means for controlling said power means associated with said bushing and arranged to render said power means operative only when said resistance reacts against said initial force.

7. In combination, a supporting bearing, a lever pivoted thereto intermediate its ends and adapted to be subjected to an initial force at one end and a resistance at the other, an eccentric bushing between said bearing and said member, power means for exerting a supplementary force on said other end of said lever against said resistance, and means for controlling said power means associated with said bushing and arranged to render said power means operative only when said initial force acts against said resistance.

8. In a motor vehicle, a spring closed clutch, a support, a manually operable lever pivoted to said support and arranged to open said clutch, power means for exerting a force on said lever tending to open said clutch, and an eccentric bushing interposed between said lever and said support and arranged to be rotated by pressure of said lever against said support to control said power means.

9. In a motor vehicle, a spring closed clutch, a support, a lever pivoted to said support intermediate its ends, one of said ends being connected to said clutch and the other of said ends adapted to receive a manual pressure to open said clutch, power means arranged to exert a force on said first mentioned end tending to open said clutch, and means on said support for rendering said power means operative only when said clutch reacts against said manual pressure.

10. In a motor vehicle, a spring closed clutch, a support, a lever pivoted to said support intermediate its ends, one of said ends being connected to said clutch and the other of said ends adapted to receive a manual pressure to open said clutch, power means arranged to exert a force on said first mentioned end tending to open said clutch, and an eccentric bushing between said support and said lever for controlling said power means and arranged to render the same operative only when such manual pressure acts against said clutch.

11. In a motor vehicle, a combustion engine, a spring closed clutch, a support, a manually operable lever pivoted to said support and arranged to open said clutch, a cylinder, a piston connected to said lever and slidable in said cylinder, one end of said cylinder being open to atmosphere and the other end of said cylinder having a port communicating with the intake manifold of said engine, a valve arranged to interrupt communication between the last mentioned end of said cylinder and said intake manifold and to open said cylinder to atmosphere, and means associated with said lever and said support for operating said valve arranged to maintain communication between said cylinder and said intake manifold only when said clutch spring reacts against said lever.

12. In combination with a support, a control lever manually operable against a resistance and pivoted on said support, power means operable to decrease said resistance, and means associated with the pivot of said lever and controlled by the pressure of said lever against said pivot for operating said power means.

In testimony whereof I hereunto affix my signature.

WILLIAM R. SPILLER.